(12) United States Patent
Jenkinson et al.

(10) Patent No.: US 10,024,182 B2
(45) Date of Patent: Jul. 17, 2018

(54) COOLED COMPOSITE SHEETS FOR A GAS TURBINE

(71) Applicant: Siemens Aktiengesellschaft, Munich (DE)

(72) Inventors: Paul Jenkinson, Lincoln (GB); Mike McKenna, Newark (GB)

(73) Assignee: Siemens Aktiengesellschaft, Munich (DE)

( * ) Notice: Subject to any disclaimer, the term of this patent is extended or adjusted under 35 U.S.C. 154(b) by 316 days.

(21) Appl. No.: 14/773,346

(22) PCT Filed: Jan. 24, 2014

(86) PCT No.: PCT/EP2014/051396
§ 371 (c)(1),
(2) Date: Sep. 6, 2015

(87) PCT Pub. No.: WO2014/139715
PCT Pub. Date: Sep. 18, 2014

(65) Prior Publication Data
US 2016/0017736 A1 Jan. 21, 2016

(30) Foreign Application Priority Data
Mar. 15, 2013 (EP) .................................... 13159477

(51) Int. Cl.
*F03B 11/00* (2006.01)
*F01D 9/06* (2006.01)
(Continued)

(52) U.S. Cl.
CPC .............. *F01D 9/065* (2013.01); *B32B 3/266* (2013.01); *B32B 15/04* (2013.01); *F01D 5/147* (2013.01);
(Continued)

(58) Field of Classification Search
CPC .......... F01D 9/065; F01D 25/12; F01D 5/147; F01D 5/282; F01D 5/288; F01D 11/24;
(Continued)

(56) References Cited

U.S. PATENT DOCUMENTS 3,411,794 A 11/1968 Allen
3,584,972 A 6/1971 Bratkovich et al.
(Continued)

FOREIGN PATENT DOCUMENTS

CN 102146811 A 8/2011
DE 10261071 A1 7/2004
(Continued)

OTHER PUBLICATIONS

RU Office Action dated Nov. 17, 2016, for RU patent application No. 2015139329.
(Continued)

*Primary Examiner* — Laert Dounis
*Assistant Examiner* — Kelsey Stanek
(74) *Attorney, Agent, or Firm* — Beusse Wolter Sanks & Maire

(57) ABSTRACT

A laminated sheet for a gas turbine component, the laminated sheet has a first cover layer, a second cover layer and a first intermediate layer, wherein the first cover layer, the second cover layer and the first intermediate layer are stacked together on top of each other. The first intermediate layer is located between the first cover layer and the second cover layer. The first intermediate layer has at least one first elongated through hole, wherein a cooling fluid is flowable through the first elongated through hole.

20 Claims, 3 Drawing Sheets

(51) Int. Cl.
  *F23R 3/00* (2006.01)
  *F01D 5/14* (2006.01)
  *F01D 5/28* (2006.01)
  *B32B 15/04* (2006.01)
  *B32B 3/26* (2006.01)
  *F01D 25/12* (2006.01)
  *F01D 11/24* (2006.01)

(52) U.S. Cl.
  CPC .............. *F01D 5/282* (2013.01); *F01D 5/288* (2013.01); *F01D 25/12* (2013.01); *F23R 3/002* (2013.01); *F23R 3/005* (2013.01); *B32B 2307/714* (2013.01); *B32B 2603/00* (2013.01); *F01D 11/24* (2013.01); *F05D 2240/81* (2013.01); *F05D 2260/204* (2013.01)

(58) Field of Classification Search
  CPC ..... B32B 3/266; B32B 2603/00; F23R 3/002; F23R 3/005
  USPC ................. 415/115, 175; 60/752, 806, 754
  See application file for complete search history.

(56) References Cited

U.S. PATENT DOCUMENTS

| | | | |
|---|---|---|---|
| 3,606,572 A * | 9/1971 | Schwedland | F01D 5/184 29/889.721 |
| 3,619,082 A | 11/1971 | Meginnis | |
| 3,900,629 A * | 8/1975 | Spencer | B32B 3/10 156/252 |
| 4,004,056 A | 1/1977 | Carroll | |
| 4,044,186 A | 8/1977 | Stangeland | |
| 4,168,348 A | 9/1979 | Bhangu et al. | |
| 4,311,433 A | 1/1982 | Bratton et al. | |
| 4,315,406 A | 2/1982 | Bhangu et al. | |
| 4,376,004 A | 3/1983 | Bratton et al. | |
| 4,838,031 A | 6/1989 | Cramer | |
| 2003/0056516 A1 | 3/2003 | Hadder | |
| 2011/0110790 A1 | 5/2011 | Itzel et al. | |
| 2012/0006518 A1 | 1/2012 | Lee et al. | |
| 2012/0034075 A1 | 2/2012 | Hsu et al. | |

FOREIGN PATENT DOCUMENTS

| | | |
|---|---|---|
| EP | 1635119 A2 | 3/2006 |
| GB | 1285369 A | 8/1972 |
| GB | 1487741 | 10/1977 |
| GB | 1487741 A | 10/1977 |
| JP | S4825687 B1 | 7/1973 |
| JP | S55148151 A | 11/1980 |
| RU | 2088764 C1 | 6/2010 |
| RU | 97479 U1 | 9/2010 |

OTHER PUBLICATIONS

JP office action dated Apr. 3, 2017, for JP patent application No. 2015-561989.
JP Office Action dated Aug. 15, 2016, for JP application No. 2015561989.

* cited by examiner

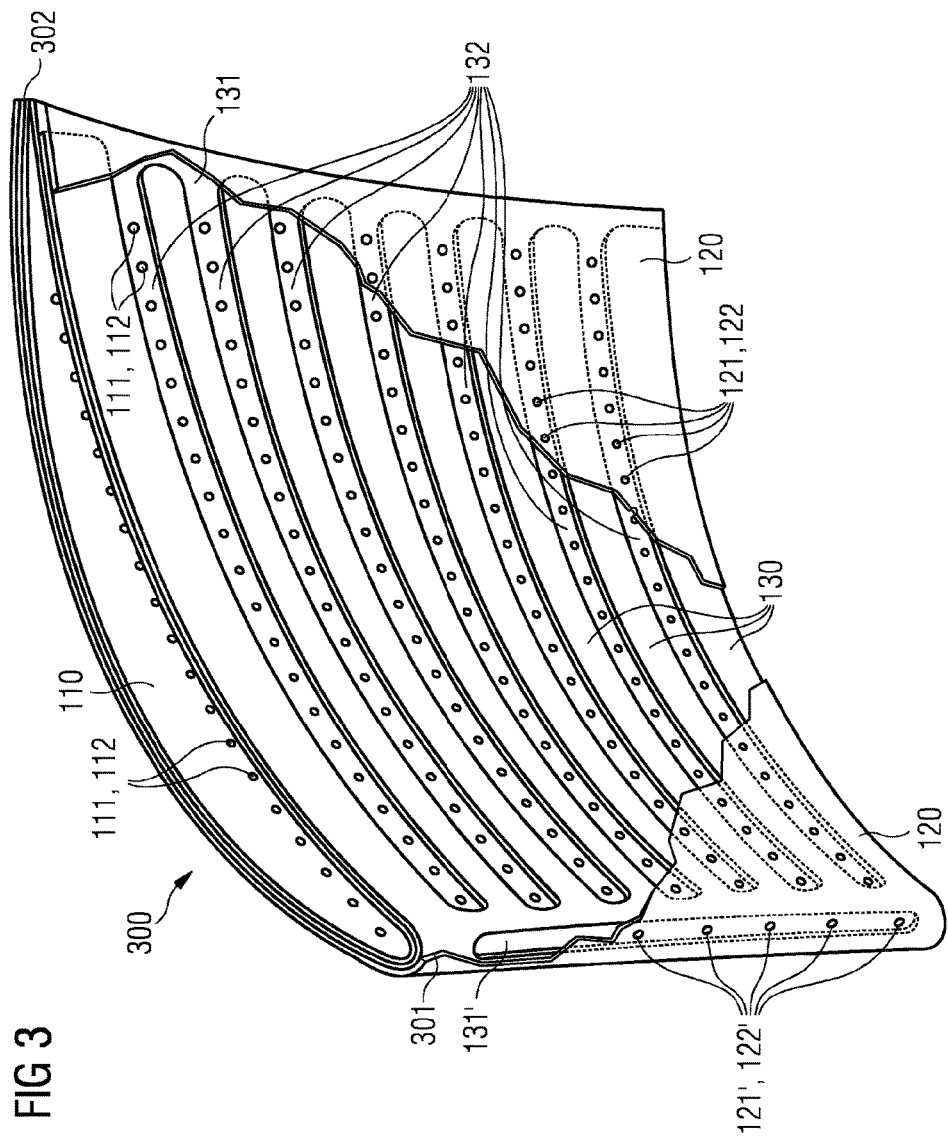

US 10,024,182 B2

COOLED COMPOSITE SHEETS FOR A GAS TURBINE

CROSS REFERENCE TO RELATED APPLICATIONS

This application is the US National Stage of International Application No. PCT/EP2014/051396 filed Jan. 24, 2014, and claims the benefit thereof. The International Application claims the benefit of European Application No. EP13159477 filed Mar. 15, 2013. All of the applications are incorporated by reference herein in their entirety.

FIELD OF INVENTION

The present invention relates to a laminated sheet for a gas turbine comprising a cooling channel for a cooling fluid. Furthermore, the present invention relates to a method of manufacturing a lamination sheet for a gas turbine.

BACKGROUND OF INVENTION

In order to increase the power and the efficiency of gas turbines, the entry temperatures in modern gas turbines become higher and higher. For that reason, an increasing number of turbine components need some sort of cooling structures to achieve an acceptable lifespan. However, an increase in e.g. cooling air usage has a negative effect on the efficiency of the gas turbine such that more efficient cooling methods are required. For example, this can be achieved on smaller components by the use of complex cooling features formed into the components. However, for larger structures made of sheet metal, for example, the cooling methods which are available are much more limited than those components that are manufactured by precision casting or machining, etc.

Previously fabricated structures for gas turbine components have been made suitable for use in higher temperature environments by manufacturing the turbine components from evermore exotic materials. The use of such exotic materials is expensive and limited by the available materials.

Alternatively, it is known to use double-skin components which are spaced apart from each other such that cooling fluid streams between the components. The design of such double components is costly due to the complex arrangement and the alignment between each other and limits the design and profile flexibility of the turbine components.

U.S. Pat. No. 4,168,348 discloses a perforated laminated material for a combustion chamber of a gas turbine. The material comprises at least two abutting sheets of a perforated material, the perforation being out of alignment and interconnected by a series of channels formed on or both of the abutting surfaces of the abutting sheets.

U.S. Pat. No. 3,584,972 discloses a sheet material of a controlled porous characteristic made up of two or more metal lamina bonded together, the lamina being photo etched or otherwise machined to define pores through the lamina and also passages between the abutting faces of the lamina. The sheet may be used for turbine blades or other hot parts of the gas turbine.

SUMMARY OF THE INVENTION

It may be an objective of the present invention to provide a laminated sheet for a gas turbine component, wherein manufacturing costs and complexity of the laminated sheet is reduced.

This objective may be solved by a laminated sheet for a gas turbine component and by a method of manufacturing a gas turbine component according to the independent claims.

According to a first aspect of the present invention, a laminated sheet for a gas turbine component is presented. The laminated sheet comprises a first cover layer, a second cover layer and a first intermediate layer. The first cover layer, the second cover layer and the first intermediate layer are stacked together on top of each other, wherein the first intermediate layer is located between the first cover layer and the second cover layer. The first intermediate layer comprises at least one first elongated through-hole, wherein a cooling fluid is flowable through the first elongated through hole. In other words, the material of the first intermediate layer which surrounds the first elongated through-hole, the first cover layer and the second cover layer form a first cooling channel through which a cooling fluid is flowable.

According to a further aspect of the present invention, a method of manufacturing a laminated sheet for a gas turbine is presented. According to the method, at least one first elongated through-hole is formed into a first intermediate layer. A first cover layer, a second cover layer and the first intermediate layer is stacked together on top of each other. The first intermediate layer is located between the first cover layer and the second cover layer. A cooling fluid is flowable through the first elongated through hole. The first elongated through-hole, the first cover layer and the second cover layer form a cooling channel through which the cooling fluid is flowable.

A gas turbine component may be used for example for building a guide vane, a turbine blade or a combustion chamber of a gas turbine. The laminated sheet may form a part of a wall element or a housing of the respective gas turbine component. The laminated sheet may be the part of the gas turbine component which is in contact with the hot working gas of the gas turbine.

The first cover layer, the second cover layer and the respective intermediate layer may be made of a metal material. The first cover layer, the second cover layer and the first intermediate layer may comprise identical materials or may have different materials with respect to each other. For example, one of the first cover layers, the second cover layers or the first intermediate layer may be made of a metal material, wherein the other layers are formed from a different material class, for example a glass or ceramic material or carbon fibre, or vice versa.

In an exemplary embodiment, the outer cover layer (e.g. the first cover layer which may be exposed to the hot working gas of a turbine) may be made of different materials with respect to the first/second intermediate layers and the inner cover layer (e.g. the second cover layer which is exposed to the cooling fluid) in order to suit their respective conditions. The first cover layer may be located (externally) in a gas washed (hot) oxidation regime and the second cover layer may be located (internally) in a cooling air (cooler) substantially inert regime or alternatively in a corrosion regime. Specifically, the first (e.g. outer) cover layer comprises a first material, in particular an oxidation resistant material and the first intermediate layer, second intermediate layer and/or the second (e.g. inner) cover layer comprise a second material, in particular a corrosion resistant material. This may improve life and reduce cost.

Between the first cover layer and the second cover layer, a plurality of intermediate layers may be inserted. Hence, the laminated sheet may comprise a stack of a plurality of layers, in particular of a first cover layer, a second cover layer and a plurality of respective first and/or second intermediate layers.

The first intermediate layer comprises the elongated through-hole which forms the first cooling channel. The elongated through-hole comprises an extending direction which directs along a surface of the respective first cover layer or second cover layer. Specifically, an inner surface of the first cover layer or the second cover layer comprises a respective normal which directs in the direction to the first intermediate layer. The extending direction of the first elongated through-hole is in particular perpendicular to the normal of the inner surface of the respective cover layer. Hence, it is outlined, that the elongated through-hole is not only a through-hole through which the cooling fluid flows along a direction parallel to the normal of the respective surface of the respective cover layer but the first elongated through-hole is formed such that the cooling fluid flowing through the first elongated through-hole flows along the surface of the respective cover layers and hence perpendicular to the normal of the surface of the respective cover layer.

By the approach of the present invention, a respective cooling channel is formed by the respective elongated through-hole and the respective inner surfaces of the respective cover layers. Further grooves or machine slots in the first or second cover layers are not necessary to form the cooling channel. Moreover, forming an elongated through-hole in the intermediate layer is easier in comparison to forming a groove with a predefined depth into the intermediate layer, because it is difficult to adjust a desired depth of such groove during the manufacturing process.

In particular, the first cover layer and the second cover layer are free of any grooves for forming the cooling channel. The cooling channel is only formed by the first elongated through-hole which is machined in the first intermediate layer.

Hence, because no grooves are necessary in the respective cover layers, an adjustment and alignment of the respective cover layers with respect to the intermediate layer is simplified, because it is not necessary to exactly adjust the respective cover layers with respect to the intermediate layer in order to form the respective cooling channel.

Furthermore, it is also possible to bend the laminated sheet after the cover layers are stacked together, because misalignments which may arise due to a bending of the conventional double-skin sheets, which comprise spaced wall elements.

According to a further exemplary embodiment, the laminated sheet comprises a second intermediate layer. The first cover layer, the second cover layer, the first intermediate layer and the second intermediate layer are stacked together on top of each other, wherein the second intermediate layer is located between the first intermediate layer on the one side and the first cover layer or the second cover layer on the other side. The second intermediate layer comprises at least a second elongated through-hole through which the cooling fluid may flow. The second elongated through hole forms a second cooling channel through which the cooling fluid is flowable.

The second intermediate layer may be aligned with respect to the first intermediate layer in such a way that the first cooling channel and the second cooling channel are spaced from each other and such that the first cooling channel and the second cooling channel are isolated from each other so that each of the cooling channels comprise separate cooling fluid inlets and outlets.

Alternatively, the first cooling channel and the second cooling channel may be coupled such that a cooling fluid may flow from the one first cooling channel to the other second cooling channel, for example.

In a further exemplary embodiment, the first elongated through-hole and the second elongated through-hole are parallel with respect to each other.

According to a further exemplary embodiment, the first elongated through-hole extends along a first direction and a second elongated through-hole extends along a second direction, wherein the first direction and the second direction are non-parallel, in particular perpendicular, with respect to each other. Hence, the cooling channel and the further cooling channel may form a cooling channel matrix, for example.

According to a further exemplary embodiment, the first elongated through-hole and the second elongated through-hole overlap each other at an overlapping region, such that the cooling fluid is flowable between the first elongated through-hole (and the first cooling channel, respectively) and the second elongated through-hole (and the second cooling channel, respectively). In other words, if the first intermediate layer is directly located onto the second intermediate layer, the first cooling channel and the second cooling channel are aligned in such a way that they cross each other at the overlapping regions, wherein at the overlapping regions an exchange of the cooling fluid between the respective cooling channels is possible.

According to a further exemplary embodiment, the first cover layer comprises a first through-hole, wherein the first cover layer is aligned with respect to the first intermediate layer such that the cooling fluid is flowable between the first through-hole and the cooling channel. Hence, the first through-hole may function as a cooling fluid inlet and/or a cooling fluid outlet through which the cooling fluid is flowable into or from the first cooling channel.

Alternatively, the first cover layer and/or the second cover layer may be free of any through-holes through which the cooling fluid is guidable to the respective cooling channels. The cooling fluid may then be guided into the respective cooling channels through a narrow side (front face) of the respective laminated sheet. The respective first elongated through-hole and/or the respective second elongated through-hole may be an open elongated through-hole which has an opening at a narrow side (front face) of the respective first and/or second intermediate layer. Hence, the respective elongated through-hole comprises a respective cooling fluid inlet/outlet which is formed at the respective narrow side of the respective intermediate layer such that the cooling fluid is guidable through the respective inlets/outlets along a direction which is approximately perpendicular to the normal of an inner surface of the respective first and/or second cover layer.

According to a further exemplary embodiment, the first cover layer comprises a further first through-hole which is spaced to the first through-hole, wherein the first cover layer is aligned with respect to the first intermediate layer such that the cooling fluid is flowable between the further first through-hole and the first elongated through hole, i.e. the first cooling channel. Hence, a plurality of cooling fluid inlets and outlets may be provided by the first cover layer such that the cooling fluid is feedable or drainable from the respective cooling channel.

In an exemplary embodiment, the plurality of first through-holes and further first through-holes may be provided through the respective first cover layer, wherein through the first and/or further first through-holes cooling fluid from the first cooling channel may be exhausted such that a film cooling of the laminated sheet and specifically the respective first cover layer may be provided.

According to a further exemplary embodiment, the second cover layer comprises a second through-hole, wherein the second cover layer is aligned with respect to the first intermediate layer and/or the second intermediate layer, respectively, such that the cooling fluid is flowable between the second through-hole and the respective (first or second) elongated through hole, i.e. cooling channel.

For example, in an exemplary embodiment, cooling fluid may be injected into the first elongated through hole through the first through-hole and the cooling fluid may be drained off from the respective elongated through hole through the second through-holes in the second cover layer, for example.

Hence, the cooling fluid may be injected through the first through-holes into the respective cooling channel from an outer region of the laminated sheet, wherein after cooling the laminated sheet, the cooling fluid is drained off through the second through-holes. Specifically, the cooling fluid is drained off through the second through-holes into an inner volume of the gas turbine, where the hot working gas streams along (e.g. into the combustion chamber of the gas turbine). Hence, a so called film-cooling of the inner side of the gas turbine component may be provided.

According to a further exemplary embodiment, the second cover layer comprises a further second through-hole which is spaced from the second through-hole. The second cover layer is aligned with respect to the first intermediate layer and/or second intermediate layer such that the cooling fluid is flowable between the further second through-hole and the first (or second) elongated through hole.

According to a further exemplary embodiment, the first intermediate layer comprises at least one further first elongated through-hole which is spaced apart from the first elongated through-hole. The further first elongated through-hole forms a further first cooling channel such that the cooling fluid is flowable within the further first elongated through-hole.

The first elongated through-hole and the further first elongated through-hole may be in an exemplary embodiment parallel to each other or in another exemplary embodiment non-parallel, in particular perpendicular, with respect to each other. Hence, the first elongated through-hole and the further first elongated through hole may cross each other.

In particular, according to an exemplary embodiment, the first intermediate layer comprises a plurality of further first elongated through-holes which are spaced apart from each other and from the first elongated through-hole.

According to a further exemplary embodiment, the first elongated through-hole and the further first elongated through-hole are connected such that the cooling fluid is flowable between the first elongated through-hole and the further first elongated through-hole. Hence, the first elongated through-hole and the further first elongated through-hole form a matrix and a cooling fluid circulation between each other, respectively.

Accordingly, also the second intermediate layer may comprise respective further second elongated through-holes which may be parallel to the second elongated through-hole or non-parallel to the respective second elongated through-holes.

According to a further exemplary embodiment, the first elongated through-hole and the further first elongated through-hole are connected such that the cooling fluid is flowable between the first elongated through-hole and the further first elongated through-hole.

If the first elongated through-holes and the further first elongated through-holes run non-parallel with respect to each other, the first elongated through-holes and the further first elongated through-holes cross or overlap each other, respectively, such that a matrix of cooling channels may be formed.

According to a further exemplary embodiment, the first cover layer and/or the second cover layer comprises a fluid guiding element. The fluid guiding element extends from the first cover layer, in particular from the inner surface of the first cover layer, into the first elongated through hole for guiding the cooling fluid within the first cooling channel. Alternatively, the fluid guiding element may also extend from the second cover layer, i.e. from the inner surface of the second cover layer, into the first elongated through hole or into the second elongated through hole, respectively.

The fluid guiding elements may form a fin, ribs, pedestals, dimples, etc., for example.

Summarizing, by the present invention a composite laminated sheet is provided which is composed of a number of layers, such as at least the first cover layer, the second cover layer, the first intermediate layer and/or a plurality of intermediate layers. At least one of the intermediate layers is formed in such a way as to provide cooling channels by comprising elongated through-holes. Furthermore, from the cover layers, fluid guiding elements may extend into the respective elongated through-holes.

The respective layers (cover layers and intermediate layers) may be bonded together to form a single laminated sheet with embedded cooling channels, in particular formed by the elongated through-holes in the intermediate layers and with embedded cooling features, such as the fluid guiding elements. The laminated sheet may be used to form a final gas turbine component. Furthermore, the laminated sheet may be attached to many other adjacent laminated sheets in order to form the final component, such as the combustion chamber or a guide vane of a gas turbine. The shape and the features of the above-described laminated sheet could be used to allow the use of resistance welding in order to fuse the multiple layers together. The respective layers, in particular the intermediate layers, may also be corrugated to form the elongated through-holes (cooling passages). The fluid guiding element could be added into the cooling channels to increase the heat transfer.

By the approach of the present invention, the use of the above-described laminated sheet which is cooled by the cooling fluid allows many different structures and components within the gas turbine, wherein complex cooling features may be obsolete. On the other side, a proper cooling efficiency is achieved such that the firing temperatures may be increased or the mass flow of the cooling fluid may be reduced. Also cheaper materials may be used and a longer component life of the gas turbine is achieved.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

FIG. 3 shows an exemplary view of a gas turbine component, in particular a nozzle guide vane, which is made of a laminated sheet according to an exemplary embodiment of the present invention.

DETAILED DESCRIPTION

Figure 1:
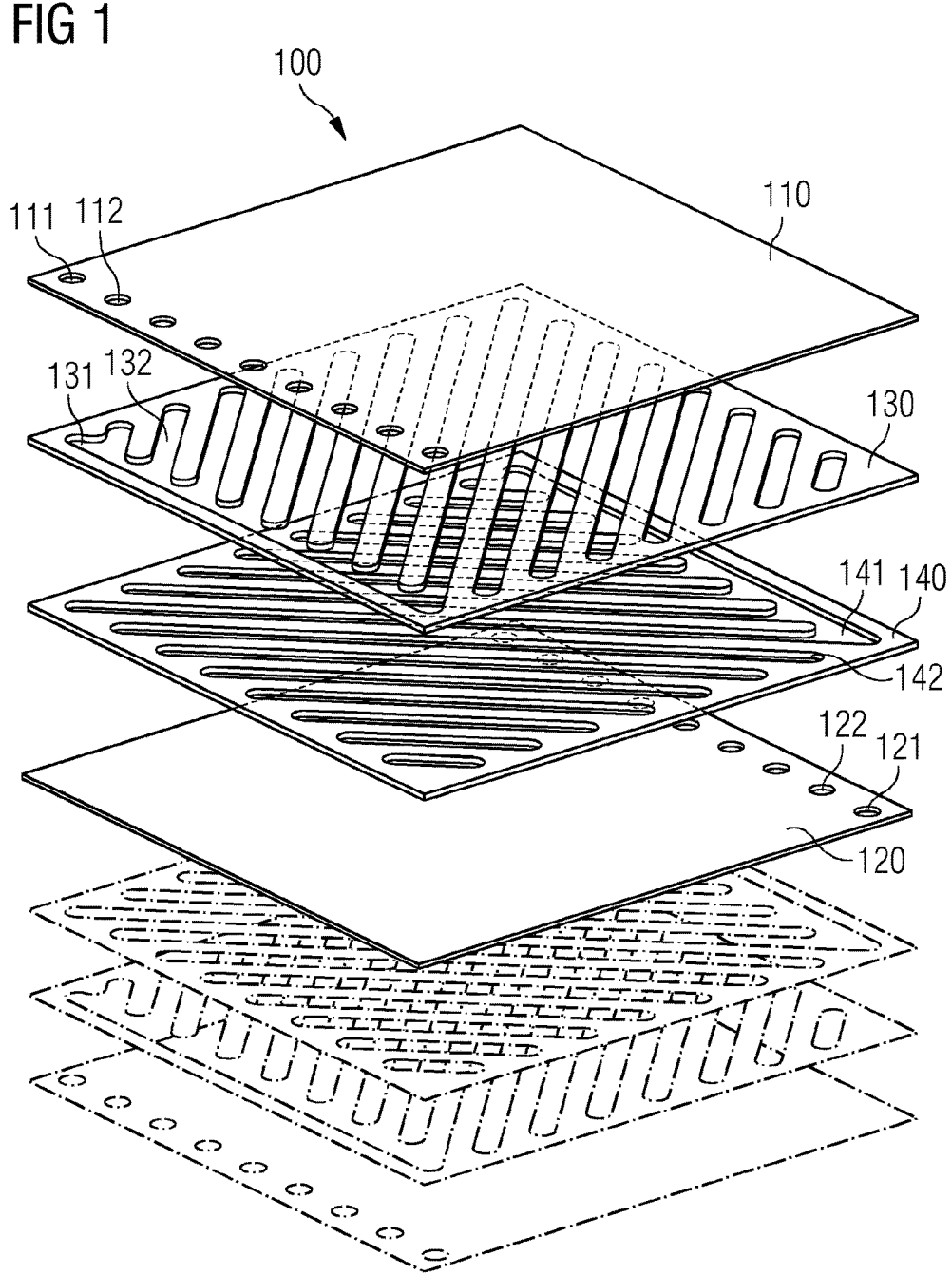
FIG. 1 shows an illustrative view of a laminated sheet comprising four layers according to an exemplary embodiment of the present invention.

The illustrations in the drawings are schematical. It is noted that in different figures, similar or identical elements are provided with the same reference signs.

Figure 2:
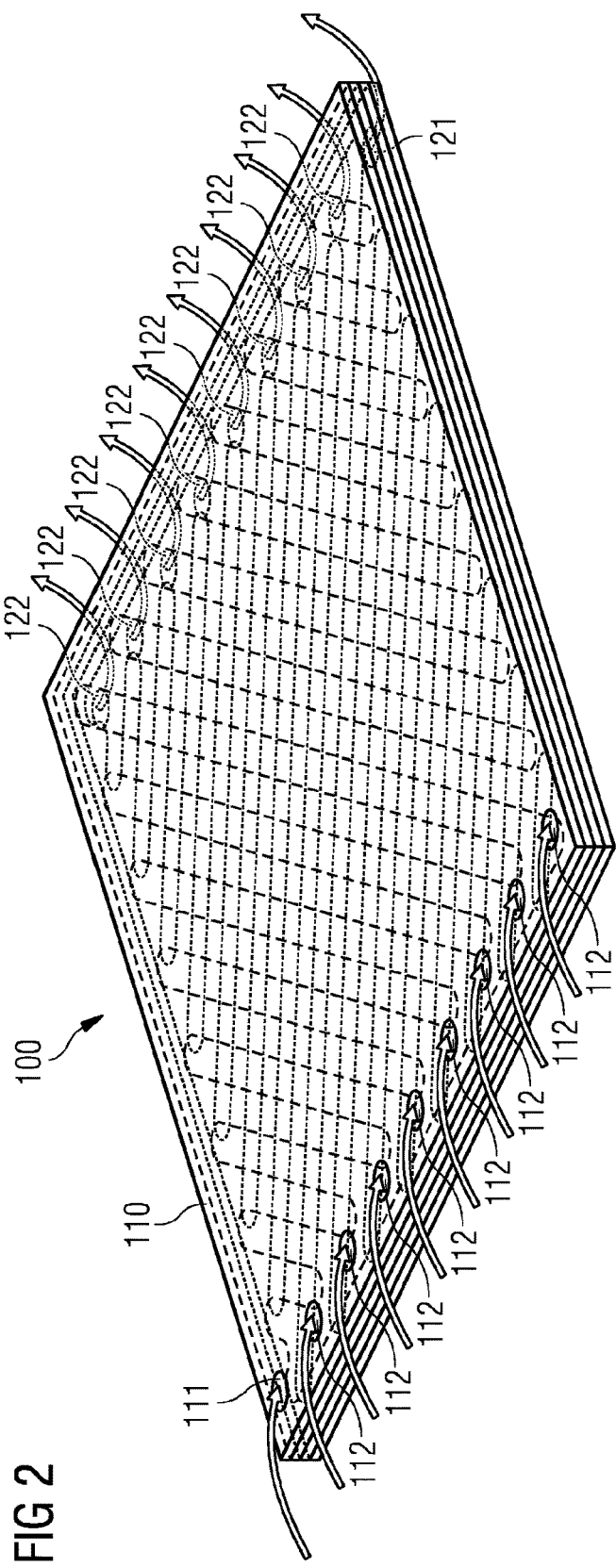
FIG. 2 shows an exemplary view of the finished laminated sheet as shown in FIG. 1 according to an exemplary embodiment of the present invention.

FIG. 1 and FIG. 2 show an exemplary embodiment of the laminated sheet 100 for a gas turbine component according to an exemplary embodiment of the present invention, wherein in FIG. 1 an explosive view of the used layers 110, 120, 130, 140 is shown and wherein in FIG. 2, the finished laminated sheet 100, where all layers 110, 120, 130, 140 are bonded together, is shown.

As can be taken from FIG. 1, the laminated sheet 100 comprises a first cover layer 110, a second cover layer 120 and a first intermediate layer 130. Additionally, the exemplary embodiment shown in FIG. 1 shows the laminated sheet 100 with a further second intermediate layer 140.

However, the laminated sheet 100 may be formed with one first intermediate layer 130, with two intermediate layers 130, 140 or with a plurality of intermediate layers 130, 140.

The first cover layer 110, the second cover layer 120 and the first intermediate layer 130 are stacked together on top of each other. The first intermediate layer 130 is located between the first cover layer 110 and the second cover layer 120. The first intermediate layer 130 comprises at least a first elongated through-hole 131. The first elongated through-hole 131, the first cover layer 110 and the second cover layer 120 form a first cooling channel through which a cooling fluid is flowable.

In the exemplary embodiment shown in FIG. 1, the laminated sheet 100 further comprises a second intermediate layer 140 which is located between the first intermediate layer 130 on the one side and the second cover layer 120 on the other side. The second intermediate layer 140 comprises at least a second elongated through-hole 141 which forms a further cooling channel such that the cooling fluid is flowable within the further second cooling channel.

In the exemplary embodiment shown in FIG. 1, the first intermediate layer 130 comprises a plurality of elongated through-holes 131, 132. The plurality of further first elongated through-holes 132 extends parallel with respect to each other. The first elongated through-hole 131 extends non-parallel to the further first elongated through-holes 132.

In the exemplary embodiment shown in FIG. 1, the first elongated through-hole 131 crosses the elongated through-holes 132 such that the first elongated through-hole 131 is connected and coupled to the further first elongated through-holes 132. Hence, cooling fluid may flow from the cooling channel formed by the first elongated through-hole 131 to all of the further cooling channels formed by the further first elongated through-holes 132.

As shown in FIG. 1, a first through-hole 111 and a plurality of further first through-holes 112 are formed in the first cover layer 110. Through the respective through-holes 111, 112, the cooling fluid may be injected or bled off through the respective elongated through-holes 131, 132.

Additionally, fluid guiding elements, such as protrusions and/or fins may extend from an inner surface of the first cover layer 110 into the respective first elongated through-holes 131, 132 in order to increase the heat transfer and in order to guide the cooling fluid flowing through the respective cooling channels. For sake of clarity, the fluid guiding elements are not shown in the figures.

Furthermore, FIG. 1 shows the second intermediate layer 140 which comprises a second elongated through-hole 141 and a further second elongated through-hole 142. The second intermediate layer 140 comprises a plurality of second elongated through-holes 141, 142. The plurality of further second elongated through-holes 142 extends parallel with respect to each other. The second elongated through-hole 141 extends non-parallel to the further second elongated through-holes 142.

In the exemplary embodiment shown in FIG. 1, the second elongated through-hole 141 crosses the further second elongated through-holes 142 such that the second elongated through-hole 141 is connected and coupled to the further second elongated through-holes 142. Hence, cooling fluid may flow from the cooling channel formed by the second elongated through-hole 141 to all of the further cooling channels formed by the further second elongated through-holes 142.

As shown in FIG. 1, a second through-hole 121 and a plurality of further second through-holes 122 are formed in the second cover layer 120. Through the respective through-holes 121, 122, the cooling fluid may be injected or bled off through the respective elongated through-holes 141, 142.

Additionally, fluid guiding elements, such as protrusions and/or fins may extend from an inner surface of the second cover layer 120 into the respective second elongated through-holes 141, 142 in order to increase the heat transfer and in order to guide the cooling fluid flowing through the respective cooling channels. For sake of clarity, the fluid guiding elements are not shown in the figures.

In the exemplary embodiment as shown in FIG. 1, the further first elongated through-holes 132 run non-parallel with respect to the further second elongated through-holes 142. Hence, the further first elongated through-holes 132 and the further second elongated through-holes 142 overlap each other at respective overlapping regions, such that the cooling fluid is flowable between the first elongated through-holes 131, 132 and the second elongated through-holes 141, 142. Hence, the cooling fluid may for example be injected by the first through-holes 111, 112 of the first cover layer 110 into the respective first cooling channels formed by the first elongated through-holes 131, 132 and flows further within the overlapping regions into the respective second cooling channels formed by the second elongated through-holes 141, 142 and may further be exhausted through the second through-holes 121, 122 in the second cover layer 120.

The first and second elongated through-holes 131, 141 are galleries for the distribution and collection respectively of cooling fluid. The first and second elongated through-holes 131, 141 are spaced apart and are generally at opposing ends of the laminated sheet 100. The first and second elongated through-holes 131, 141 are spaced apart by at least twice the width (i.e. normal to the elongate length or direction) of the elongate through-hole. In particular, the first and second elongated through-holes 131, 141 are spaced apart by at least five times the width of the elongate through-hole.

Advantageously, the cooling fluid flows in the plane of the laminate sheet and thus cools a large surface area. This is in contrast to having 'inlet' through-holes 111, 112 too close to 'outlet' through-holes 121, 122 where the coolant passes almost directly through the plane of the laminate without passing in the plane of the laminate. In this can be said that the coolant has a clean line-of-sight through the laminate between coolant inlet and outlet.

The first and second elongated through-holes 131, 141 are shown having generally constant widths; however, their widths may vary so as to more evenly distribute and collect coolant to and from the first and second elongated through-holes 132, 142. Furthermore, the widths of the first and second elongated through-holes 132, 142 may vary along each hole's length to advantageously increase or decrease cooling where appropriate. Similarly, the width of all of the elongate through-holes in their plurality need not be constant and again one through-hole may be wider or narrower than a neighbouring elongate through-hole. The through-holes 131, 132, 141, 142 need not be straight when viewed normal to the plane of the laminate sheet and instead may be curved, s-shaped, zig-zag, chevron or castellated for example.

The laminate sheet 100 can be flat or curved and in more than one plane.

FIG. 2 shows such an exemplary flow of the cooling fluid. The cooling fluid is injected through the through-holes 111, 112 of the first cover layer 110 and is exhausted after flowing through the respective cooling channels through the second through-holes 121, 122 in the second cover layer 120.

For example, the second through-holes 121, 122 and the second cover layer 120, respectively, may form a wall element of the respective turbine component which is in contact with the hot working gas of the gas turbine. Hence, by exhausting the cooling fluid through the respective second through-holes 121, 122, a film cooling may be generated.

FIG. 3 shows a gas turbine component, in particular a nozzle guide vane 300, of the gas turbine which is made of the laminated sheets 100 as shown in the FIGS. 1 and 2.

The nozzle guide vane 300 comprises a leading edge 301 and a trailing edge 302. The hot working gas of the gas turbine flows against the leading edge 301 and flows further along the respective surfaces to the trailing edge 302. The nozzle guide vane 300 comprises a hollow structure comprising an inner volume. The cooling fluid flows through the inner volume.

The first cover layer 110 of the nozzle guide vane 300 surrounds the inner volume of the nozzle guide vane 300.

Hence, the first cover layer 110 forms the inner layer of the guide vane 300 which is located in the inner volume of the nozzle guide vane 300 and which is in contact with the cooling fluid. The second cover layer 120 forms the outer cover layer of the nozzle guide vane 300, which is in contact with the hot working gas of the gas turbine passing the nozzle guide vane 300.

The first intermediate layer 130 is interposed between the first cover layer 110 and the second cover layer 120. The first intermediate layer 130 comprises respective cut-outs, i.e. the first elongated through hole 131 and the further first elongated through holes 132, for forming respective cooling channels between the first and second cover layers 110, 120.

The first elongated through-holes 131, 131' run perpendicular to the further first elongated through-holes 132.

Specifically, the first elongated through-holes 131, 131' run along the leading edge 301 and along the trailing edge 302, respectively. The further first elongated through-holes 132 run perpendicular to the first elongated through-holes 131, 131', such that cooling fluid is flowable through the respective further first elongated through-holes 132 in the direction between the leading edge 301 and the trailing edge 302 of the nozzle guide vane 300.

The first cover layer 110 comprises the through-holes 111, 112. The cooling fluid may flow from the inner volume through the respective first through-holes 111, 112 of the first cover layer 110 into the respective cooling channels formed by the first elongated through holes 131, 131' and the further first elongated through holes 132.

The outer second cover layer 120 comprises the second through-holes 121, 122 through which the cooling fluid may be bled off from the cooling channels. Hence, by exhausting the cooling air through the second through-holes 121, 122 an additional film cooling may be provided. Specifically, it may be efficient to form the second through-holes 121', 122' in the regions of the leading edge 301. The leading edge 301 may form one of the hottest spots of the guide vane nozzle 300 during operation of the gas turbine.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A laminated sheet for a gas turbine component, the laminated sheet comprising
    a first cover layer,
    a second cover layer,
    a first intermediate layer, and
    a second intermediate layer,
    wherein the first cover layer, the second cover layer, the first intermediate layer and the second intermediate layer are stacked together on top of each other,
    wherein the first intermediate layer is located between the first cover layer and the second cover layer, wherein the first intermediate layer comprises at least one first elongated through hole through which a cooling fluid is flowable,
    wherein the second intermediate layer is located between the first intermediate layer and the first cover layer or the second cover layer,
    wherein the first intermediate layer comprises at least one further first elongated through hole which is spaced apart from the first elongated through hole, wherein the cooling fluid is flowable through the further first elongated through hole and in a plane of the laminated sheet,
    wherein the first elongated through hole and the further first elongated through hole are connected such that the cooling fluid is flowable between the first elongated through hole and the further first elongated through hole,
    wherein the second intermediate layer comprises at least one second elongated through hole through which the cooling fluid is flowable, wherein the second intermediate layer comprises at least one further second elongated through hole which is spaced apart from the second elongated through hole, wherein the further first elongated through hole extends along a first direction and the further second elongated through hole extends along a second direction that is non-parallel with respect to the first direction and wherein the first elongated through hole and the second elongated through hole are spaced apart and are positioned at opposing ends of the laminated sheet.

2. The laminated sheet according to claim 1,
wherein the first elongated through hole and the second elongated through hole are parallel with respect to each other.

3. The laminated sheet according to claim 1,
wherein the further first elongated through hole and the further second elongated through hole overlap each other at an overlapping region, such that the cooling fluid is flowable between the further first elongated through hole and the further second elongated through hole.

4. The laminated sheet according to claim 1,
wherein the first cover layer comprises a first through hole,
wherein the first cover layer is aligned with respect to the first intermediate layer such that the cooling fluid is flowable between the first through hole and the first elongated through hole.

5. The laminated sheet according to claim 4,
wherein the first cover layer comprises a further first through hole which is spaced apart from the first through hole,
wherein the first cover layer is aligned with respect to the first intermediate layer such that the cooling fluid is flowable between the further first through hole and the first elongated through hole.

6. The laminated sheet according to claim 1,
wherein the second cover layer comprises a second through hole,
wherein the second cover layer is aligned with respect to the first intermediate layer such that the cooling fluid is flowable between the second through hole and the first elongated through hole.

7. The laminated sheet according to claim 6,
wherein the second cover layer comprises a further second through hole which is spaced apart from the second through hole,
wherein the second cover layer is aligned with respect to the first intermediate layer such that the cooling fluid is flowable between the further second through hole and the first elongated through hole.

8. The laminated sheet according to claim 1,
wherein the first intermediate layer comprises a plurality of further first elongated through holes which are spaced apart from each other and from the first elongated through hole.

9. The laminated sheet according to claim 1,
wherein the first cover layer comprises a first material, and wherein the first intermediate layer, the second intermediate layer or the second cover layer comprise a second material.

10. The laminated sheet according to claim 1,
wherein the first direction and the second direction are perpendicular with respect to each other.

11. The laminated sheet according to claim 1,
wherein the first elongated through hole and the second elongated through hole are spaced apart by at least twice a width of the first elongated through hole;
and wherein the cooling fluid is flowable from the first elongated through hole to the second elongated through hole in the plane of the laminated sheet.

12. The laminated sheet according to claim 1,
wherein the first elongated through hole and the second elongated through hole are spaced apart by at least twice a width of the first elongated through hole.

13. The laminated sheet according to claim 1,
wherein the first elongated through hole and the second elongated through hole are spaced apart by at least five times a width of the first elongated through hole.

14. A turbine component, comprising
a laminated sheet according to claim 1.

15. The turbine component of claim 14,
wherein the turbine component comprises a combustion chamber or a guide vane nozzle.

16. A laminated sheet for a gas turbine component, the laminated sheet comprising
a first cover layer,
a second cover layer, and
a first intermediate layer,
wherein the first cover layer, the second cover layer and the first intermediate layer are stacked together on top of each other,
wherein the first intermediate layer is located between the first cover layer and the second cover layer, wherein the first intermediate layer comprises at least one first elongated through hole through which a cooling fluid is flowable,
wherein the first intermediate layer comprises at least one further first elongated through hole which is spaced apart from the first elongated through hole, wherein the cooling fluid is flowable through the further first elongated through hole and in a plane of the laminated sheet,
wherein the first elongated through hole and the further first elongated through hole are connected such that the cooling fluid is flowable between the first elongated through hole and the further first elongated through hole
wherein the first elongated through hole and the further first elongated through hole are non-parallel with respect to each other.

17. The laminated sheet according to claim 16,
wherein the first elongated through hole and the further first elongated through hole are perpendicular with respect to each other.

18. A laminated sheet for a gas turbine component, the laminated sheet comprising
a first cover layer,
a second cover layer, and
a first intermediate layer,
wherein the first cover layer, the second cover layer and the first intermediate layer are stacked together on top of each other,
wherein the first intermediate layer is located between the first cover layer and the second cover layer, wherein the first intermediate layer comprises at least one first elongated through hole through which a cooling fluid is flowable,
wherein the first intermediate layer comprises at least one further first elongated through hole which is spaced apart from the first elongated through hole, wherein the cooling fluid is flowable through the further first elongated through hole and in a plane of the laminated sheet, wherein the first elongated through hole and the further first elongated through hole are connected such that the cooling fluid is flowable between the first elongated through hole and the further first elongated through hole, wherein the first cover layer comprises an oxidation resistant material, and wherein the first intermediate layer, the second intermediate layer or the second cover layer comprise a corrosion resistant material.

19. A laminated sheet for a gas turbine component, the laminated sheet comprising a first cover layer,
a second cover layer, and
a first intermediate layer,
wherein the first cover layer, the second cover layer and the first intermediate layer are stacked together on top of each other,
wherein the first intermediate layer is located between the first cover layer and the second cover layer, wherein the first intermediate layer comprises at least one first elongated through hole through which a cooling fluid is flowable,
wherein the first intermediate layer comprises at least one further first elongated through hole which is spaced apart from the first elongated through hole, wherein the cooling fluid is flowable through the further first elongated through hole and in a plane of the laminated sheet,
wherein the first elongated through hole and the further first elongated through hole are connected such that the cooling fluid is flowable between the first elongated through hole and the further first elongated through hole,
wherein the first elongated through hole crosses the further first elongated through hole such that the first elongated through hole is connected and coupled to the further first elongated through hole.

20. A laminated sheet for a gas turbine component, the laminated sheet comprising a first cover layer,
a second cover layer, and
a first intermediate layer,
a second intermediate layer,
wherein the first cover layer, the second cover layer and the first intermediate layer and the second intermediate layer are stacked together on top of each other,
wherein the first intermediate layer is located between the first cover layer and the second cover layer, wherein the first intermediate layer comprises at least one first elongated through hole through which a cooling fluid is flowable,
wherein the second intermediate layer is located between the first intermediate layer and the first cover layer or the second cover layer,
wherein the first intermediate layer comprises at least one further first elongated through hole which is spaced apart from the first elongated through hole, wherein the cooling fluid is flowable through the further first elongated through hole and in a plane of the laminated sheet,
wherein the first elongated through hole and the further first elongated through hole are directly connected such that the cooling fluid is flowable between the first elongated through hole and the further first elongated through hole,
wherein the second intermediate layer comprises at least one second elongated through hole through which the cooling fluid is flowable,
wherein the second intermediate layer comprises at least one further second elongated through hole which is spaced apart from the second elongated through hole,
wherein the further first elongated through hole extends along a first direction and the further second elongated through hole extends along a second direction that is non-parallel with respect to the first direction and
wherein the first elongated through hole and the second elongated through hole are spaced apart and are positioned at opposing ends of the laminated sheet.

* * * * *